(12) United States Patent
Nekovee et al.

(10) Patent No.: US 8,135,863 B2
(45) Date of Patent: Mar. 13, 2012

(54) EVENT NOTIFICATION NETWORK

(75) Inventors: Maziar Nekovee, Suffolk (GB); Trevor Burbridge, Suffolk (GB); Andrea Soppera, Suffolk (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1567 days.

(21) Appl. No.: 10/594,670

(22) PCT Filed: Apr. 26, 2005

(86) PCT No.: PCT/GB2005/001590
§ 371 (c)(1),
(2), (4) Date: Sep. 28, 2006

(87) PCT Pub. No.: WO2005/107207
PCT Pub. Date: Nov. 10, 2005

(65) Prior Publication Data
US 2008/0270628 A1    Oct. 30, 2008

(30) Foreign Application Priority Data
Apr. 29, 2004  (GB) .................................. 0409582.4

(51) Int. Cl.
G06F 15/16   (2006.01)
H04L 12/56   (2006.01)
(52) U.S. Cl. ...... 709/247; 709/203; 709/232; 370/395.4
(58) Field of Classification Search .......... 709/217–219, 709/246, 247, 227–229, 203, 232; 370/395.4
See application file for complete search history.

(56) References Cited

U.S. PATENT DOCUMENTS

| 5,383,187 | A  | * | 1/1995  | Vardakas et al. .............. 370/312 |
| 6,098,078 | A  |   | 8/2000  | Gehani et al. |
| 6,411,967 | B1 | * | 6/2002  | Van Renesse ......................... 1/1 |
| 6,418,139 | B1 | * | 7/2002  | Akhtar .......................... 370/356 |
| 6,434,623 | B1 | * | 8/2002  | Sasaki et al. .................. 709/232 |
| 6,557,111 | B1 |   | 4/2003  | Theimer et al. |
| 2003/0005036 | A1 | * | 1/2003 | Mitzenmacher ............. 709/203 |
| 2003/0061316 | A1 | * | 3/2003 | Blair et al. .................... 709/220 |
| 2003/0123451 | A1 | * | 7/2003 | Nielsen et al. ............. 370/395.4 |
| 2003/0231625 | A1 |   | 12/2003 | Calvignac et al. |

(Continued)

FOREIGN PATENT DOCUMENTS
EP    1193921 A2    4/2002

(Continued)

OTHER PUBLICATIONS

GB Search Report dated Sep. 1, 2004.

(Continued)

*Primary Examiner* — Ian N Moore
*Assistant Examiner* — Kiet Tang
(74) *Attorney, Agent, or Firm* — Nixon & Vanderhye P.C.

(57) ABSTRACT

Data collected by sensors (10, 30) is transmitted to data collection points (31, 61) over a network using an epidemic protocol in which data received by a relay (3) is forwarded to a randomly-selected group of further relays (4, 5, 6) unless the same data has been previously received by the relay (3) or the data is time-expired. Data received by a relay (3) from different sources (1, 2, 30) in the same time-frame is aggregated using a Bloom filter process so that in each time frame only a single Bloom filter message is transmitted by each relay.

19 Claims, 5 Drawing Sheets

U.S. PATENT DOCUMENTS

2004/0039789 A1* 2/2004 Jackson et al. ............... 709/217
2005/0033803 A1* 2/2005 Vleet et al. .................. 709/203
2005/0259682 A1* 11/2005 Yosef et al. .................. 370/468

FOREIGN PATENT DOCUMENTS

WO     WO 96/19887     6/1996
WO     WO 02/35997 A1     5/2002

OTHER PUBLICATIONS

PCT International Search Report dated Aug. 4, 2005.
GB Search Report dated Sep. 23, 2004.
Voulgaris et al., "A Robust and Scalable Peer-to-Peer Gossiping Protocol", http://www.cs.unibo.it/bison/publications/ap2pc03.pdf, Department of Computer Science, University of Bologna, last modified Nov. 24, 2003.
Eugster et al., "Lightweight Probabilistic Broadcast", http://icwww.epfl.ch/publications/docuemnts/IC_TECH_REPORT_200102.pdf, last modified Apr. 3, 2002.
At least partial translation of Office Action issued in corresponding Chinese Application No. 2005800134908.
Office Action dated Feb. 28, 2007 issued corresponding European Application No. 05 738 045.3-2413.
Communication regarding intent to grant a European patent issued in corresponding European Application No. 05 738 045.3-2413.

* cited by examiner

EVENT NOTIFICATION NETWORK

This application is the US national phase of international application PCT/GB2005/001590 filed 26 Apr. 2005 which designated the U.S. and claims benefit of GB 03409582.4, dated 29 Apr. 2004, the entire content of which is hereby incorporated by reference.

BACKGROUND

1. Technical Field of Example Embodiments of the Invention

This invention relates to communications networks for transmitting data, and in particular networks for conveying data that reports events detected by devices dispersed throughout an environment. Such devices may be used for monitoring natural phenomena such as atmospheric, oceanic or geological phenomena, or animal behaviour, or for monitoring human behaviour such as road traffic, inventory control, or monitoring the activities of vulnerable or untrustworthy people. As the devices are distributed throughout the environment to be monitored, this is known as "pervasive" computing technology.

2. Description of Related Art

Devices to perform such monitoring are readily available, such as sensor networks, RFID Tags and biometric scanners. An RFID (Radio Frequency Identification Device) is a small integrated circuit connected to an antenna, which can respond to an interrogating RF signal with simple identifying information. They are used in a number of situations. In an inventory control application, for example in a retail distribution network (factory, warehouse, distribution network, shop), the conventional "barcode" of each object is replaced with an RFID tag. Because of the wireless interface, reading such tags is much easier and faster than passing each item in turn across a conventional barcode scanner. The possibility to identify objects at a distance with a scanner provides great benefit to logistics and supply chains. The information can be generated and processed by multiple databases belonging to different departments of a company: production, disposal, material, finance, etc. The variables contained in each database are updated as soon as a tag is scanned. Variables are shared such that when data information is updated in one specific database other variables need to be updated in other locations of the network. Servers therefore need to forward event update information as soon as a variable is changed. However, in very large-scale systems congestion may occur when a large number of readers are attempting to send data at the same time.

The deployment of pervasive computing technology allows many new uses for such data, and a future can be envisaged in which such devices collectively generate billions of event notifications per second.

A many-to-many (or "Peer to Peer") messaging infrastructure is one of the most important foundations for distributed electronic business systems. During recent years event-driven and messaging infrastructures have emerged as a flexible and feasible solution to enable communication between web services, distributed databases and other software applications. Such distributed computing systems will be central to advances in a broad range of critical applications, from industrial applications to homeland security. Examples of applications include Air traffic control, military applications, healthcare, and power grid management. Tests have already been made in some of these fields using small-scale scenarios. However, on a large and complex scenario, where factors such as network reliability, load and throughput instability become significant, the maintenance of robust and scalable communications becomes a complex issue. In a situation in which millions of pervasive computing devices and distributed processes need to communicate together, the technology must be able to handle such forms of infrastructure instability.

There is therefore a need for a system that provides scalability in a large scenario such that reliable communications can be provided between a large number of participants. The characteristics and the traffic load of these applications require group communication protocols that allow multipoint communications among the different processes, such as IP Multicast. When applied to pervasive computing scenarios, traditional IP Multicast protocols, or overlay protocols built in a pure peer-to-peer manner, suffer several scaling problems. One of the more complex problems is the management of the network states managed at each participant or at each router. Even if more complex routing protocols are exploited such as content-based routing the management of content-based forwarding rules is still a complex issue that affects the scalability of the solution.

Many systems that are inherently unstable, with processors joining and leaving the system in real time. In such systems it is preferable for distributed processors to forward and route messages belonging to other distributed processors, without a centralised server being required. The system even under a large traffic load should be maintained stable and the resources of each node should not be overloaded.

One class of protocol that does not suffer the scalability and reliability problems that have been described above is a diffusion-like protocol that exploits "epidemic" or "gossip" techniques. This class of protocol scales quite well and overcomes the phenomena that cause problems of network reliability and scalability. A protocol exploiting epidemic techniques has a number of important properties: the protocol imposes steady loads on participants, is extremely simple to implement and inexpensive to run, and provides very good scalability properties in terms of membership management.

Such protocols operate in the following manner: Each processor in the system maintains a list of a subset of the full system membership; in practice this list contains the network address of other processors that are nearby. At each time interval (not synchronized across the system) each participant selects one (or more) of the processors in its membership list and sends it a message contained in a buffer store. Upon the receipt of an epidemic message, depending upon the configuration of the protocol, a processor checks if the message has already been received or the message has expired in both of these cases the message is dropped. Otherwise the message is stored in the receiving processor's own buffer for subsequent distribution to other processes.

A message can be reliably distributed if it has traveled a certain number of rounds into the network. If we denote the group size as n and we assume that a processor which has received an event informs F other processors about the same event, given a fan-out value $F > O (\log n)$, the number of rounds needed to achieve a high probability (e.g. 99%) that all group members are informed is $O (\log n)$. (Note that all logarithmic values in this specification are to base 2 unless stated: $O (\log n)$ represents a value of the order of $\log n$). Epidemic algorithms therefore sacrifice a small degree of the reliability of deterministic algorithms in exchange for very good scalability properties. As will be described in more detail later, with reference to FIG. 5, the number of nodes "infected" initially rises exponentially, and then trends asymptotically towards the value "n" as traffic declines as the result of the increasing probability of an individual message being delivered to a node that is already infected.

In order to achieve an acceptably high probability that all members of the group are informed, the amount of information sent on the network must be greater than would be the case using a multicast protocol. This is because the transmission of messages is a one-way process, without any information being available to the transmitting device about whether the other devices need that information. In general, the devices selected will include a number that have no need of that individual message, or have already received it. As can be seen from FIG. 5, the number of such messages is typically many times the number of nodes in the system. For such a protocol to be useful, it is therefore desirable to minimise the number of actual messages sent.

International Patent application WO 01/99348 discloses a method in which a processor combines several individual messages that it has received into a single combined message before onward transmission. It proposes an aggregation process in which the identities of multiple events are incorporated in a single index message. In that patent application the index message is shared and understood by the entire (interested) community. The aggregation of events into indexes is controlled outside of the distribution network in order to optimise the delivery of events to interested receivers.

BRIEF SUMMARY OF EXAMPLE
EMBODIMENTS OF THE PRESENT
INVENTION

The present invention does not address the complexity of subscription aggregation, but instead involves the aggregation of individual event reports.

According to the present invention there is provided a method of transmitting data over a decentralised network, the method comprising the steps of receiving a plurality of compressed data files at a relay device, processing the data therein to create an aggregated compressed data file, and transmitting the aggregated data file to a plurality of similar relay devices.

According to another aspect, there is provided a relay device having a receiver for receiving a plurality of compressed data files, an aggregation processor for processing the data therein to create an aggregated compressed data file, and a transmitter for selecting a plurality of similar relay devices and transmitting the aggregated data file to the selected relay devices.

In use, a network of such devices forms a network in which more than one node is used to relay information to its destination. The invention allows the data to be routed between the source and the interested destinations using a diffusion-like protocol. The relay device preparing the data for transmission, and selecting destination devices for that information, has no information about whether the other devices have need of the data to be transmitted to them, so the likelihood of a given item of information received by a given target device being required by that device is essentially random. The targets may be selected using any random, quasi-random, cyclic or other process. In the preferred embodiment an epidemic protocol is used, in which the decision on how to relay a data item is made following the theory of epidemics rather than using a pre-determined routing table or content rules. In particular the tiny parts of data are aggregated as they are relayed among nodes. This provides scalability since the routing decision and the administration cost for each message are reduced to minimum. Furthermore the aggregation aids the scalability of the network, as the rate of the information is reduced from the edge toward the core of the network. Finally the information is relayed by several nodes providing resilience, and can be received seamlessly from more than one source.

According to a further aspect there is provided a decentralised communications network in which a plurality of servers collectively maintain a database that records event reports, the plurality of servers forming an overlay network and intercommunicating using a common messaging strategy based on a publisher forwarding scheme running over the overlay network, the servers having means to aggregate compressed data messages received from one or more other servers to create a compressed aggregate message, and to broadcast the compressed aggregate message to one or more of the other servers, at least one of the servers having means to generate data messages in response to specific events, and means to aggregate the data messages so generated with the messages received from the other servers.

The aggregation can be performed automatically and locally during the distribution across the network. Although individual events are distributed to all interested receivers, many aggregations of events are both local and transient. The result is to reduce the number of messages sent, and therefore the bandwidth required. Each individual message will contain reports of many individual events, so there is a good probability that any individual message delivered to a receiver will include some data required by that receiver.

The present invention therefore provides an automated data aggregation technique to disseminate very small messages using a data propagation technique that minimises the amount of bandwidth required to transmit events and increases the likelihood of each user requiring some of the information transmitted on a specific channel.

Typically some of the relay devices will be associated with destination devices—that is to say, the devices for which the data is intended. Any such relay device will be provided with means to identify such data and have it processed by the associated destination device. In the described embodiment it would be impractical to delete such data from the aggregated message forwarded to other relay devices, but it is in any case desirable to forward it as it may also be required by other destination devices. Any data generated locally by an individual relay device, or by data collection devices associated with them, is aggregated, together with any data received from other relay devices, and forwarded in the same way.

In a preferred embodiment time-expired data may be identified and such data would not be forwarded. The device may also identify data that has previously been received by the device, and similarly not forward such data. Since, as stated above, the preferred method of aggegation makes it impractical to delete individual parts of an aggregated message, it is convenient to only aggregate data having the same expiry time, so that all data in the message expire together and a complete aggregate message can therefore be deleted without disturbing messages that have yet to reach their expiry times.

In the preferred system the messages are aggregated Bloom filter messages. The "Bloom" filter is a method for representing a set of elements such that queries can be made, and was first described by Burton H. Bloom in an article "*Space/time trade-offs in hash coding with allowable errors*" (Communications of the ACM archive Volume 13, Issue 7 (July 1970) pages 422-426. It will be described in more detail later in this specification. Bloom filters have been used for a wide variety of uses from detection of IP address trails to subscription aggregation, but have not previously been used as an aggregation technique for event notification. Bloom filters are very efficient for transmitting notification information, as they do not involve a high computational requirement to append a new message to an existing one.

In the present invention the Bloom filters are aggregated with other data (including other Bloom filters) as they are relayed across the network. When multiple messages arrive at a network node the messages are aggregated into a single message and distributed to other nodes in the network. Messages are propagated by more than one node at once and distributed to the final receivers. Receivers query the filter in order to identify whether information in which they are interested is present in the message.

BRIEF DESCRIPTION OF DRAWINGS

An embodiment of the invention will now be described, by way of example only, with reference to the drawings, in which.

DETAILED DESCRIPTION OF EXAMPLE EMBODIMENTS

Figure 1:
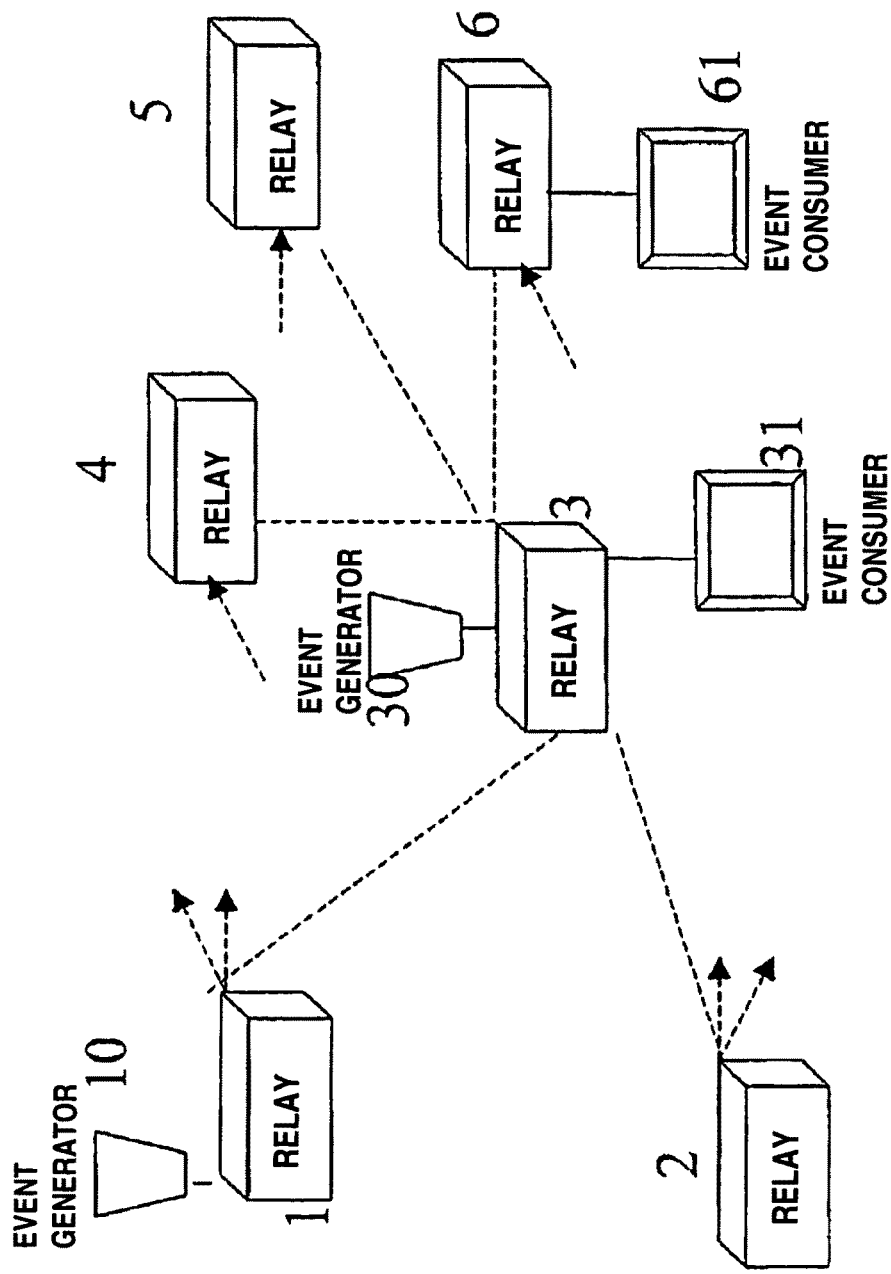
FIG. 1 is a schematic representation of a network of devices operating according to the invention

FIG. 1 illustrates schematically a simplified network according to the invention in which several relay devices 1, 2, 3, 4, 5, 6 operate. Their interconnectivity would in practice be more complex than shown in the Figure.

Typically a system that uses this approach would be composed of three main functions:

event-generators 10, 30, which generate event notifications in response to a change of a state—typically a real variable monitored by the node, such as the scanning of an RFID tag.

event-relays 1, 2, 3, 4, 5, which aggregate and forward event notifications produced by other nodes following the rules of an epidemic protocol.

event-consumers 31, 61, which process a high layer application of occurrences of events to which they have subscribed on receipt of a notification of that event. Where the data required is minimal (just a few bits) as in the case of RFID tags, the notification can contain the information required, but in general the notification is only a reference to the data actually required, such as an internet address or "url" (uniform resource locator, the consumer withdrawing the data using another messaging technology.

Figure 2:
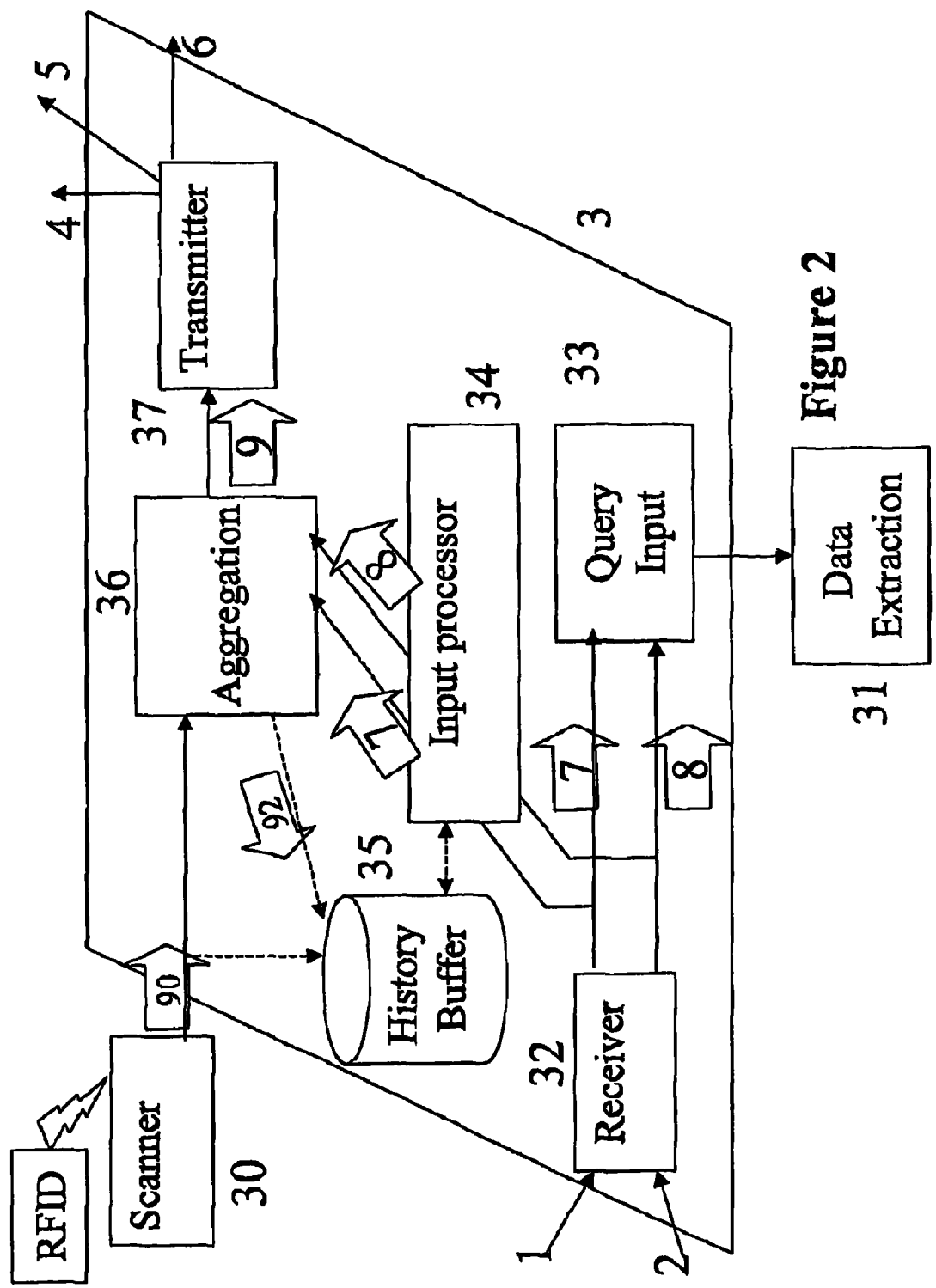
FIG. 2 is a diagrammatic representation of an individual device according to the invention
Figure 5:
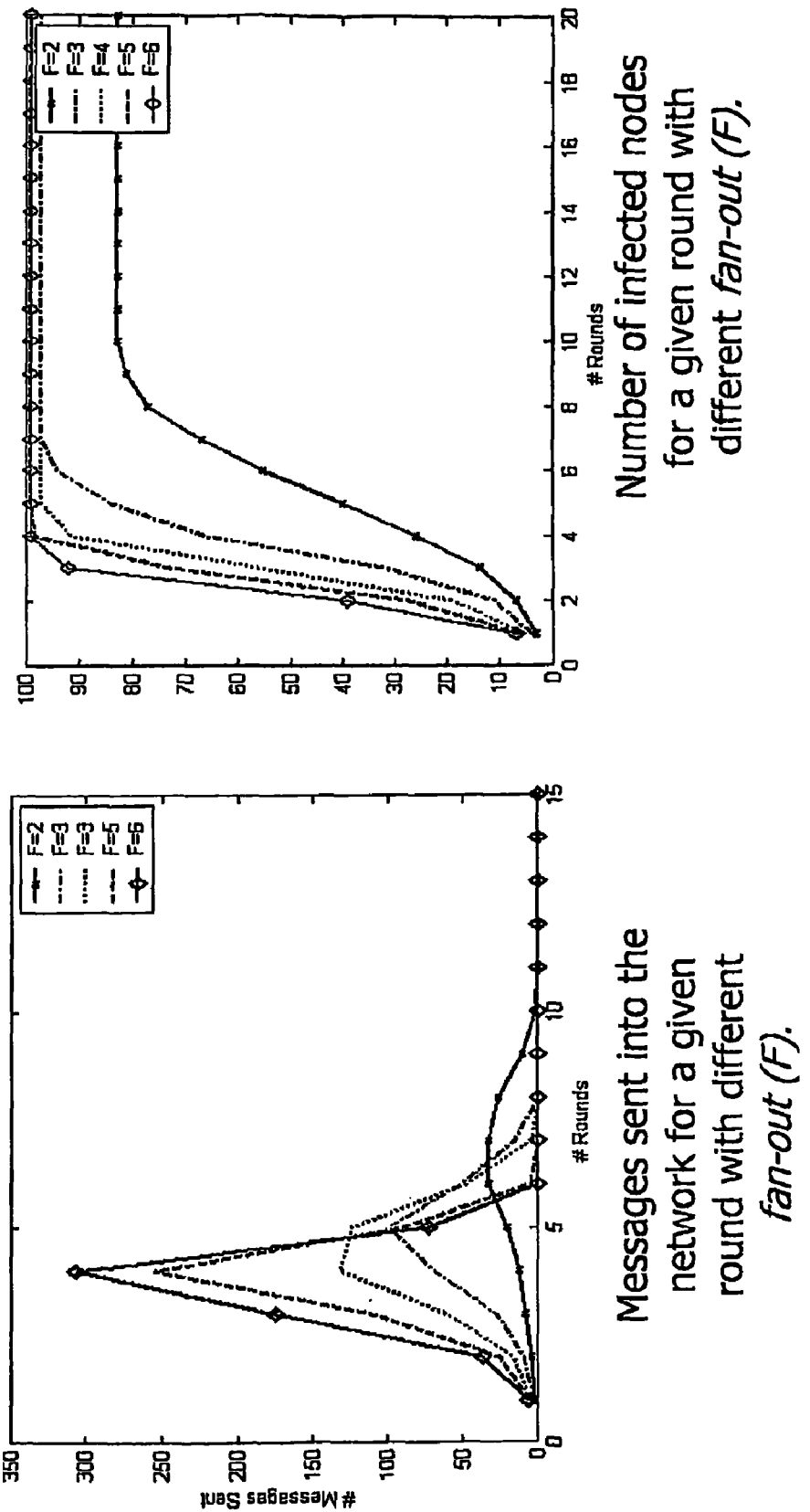
FIG. 5 illustrates the results of a simulation of an epidemic transmission process.

Every node 1, 2, 3, 4, 5, 6 also acts as an event relay to disseminate the events in an epidemic way, thereby improving the distribution of the information. For example relay device 3 forwards messages to a set of relay devices 4, 5, 6. Each of these receiving nodes 4, 5, 6 may also receive messages from other devices (not shown). Similarly, relay devices 1, 2 both forward messages to relay device 3 (and to other relay devices not shown). Relative to a given relay device 3 the devices 1, 2 will be referred to as "originating nodes" and the devices 4, 5, 6 as "receiving nodes" but it must be understood that these terms are relative: for example, seen from the perspective of nodes 1 and 2, node 3 is a "receiving node". The number of nodes to which each node forwards a message is known as the "fan-out" value F. A suitable fan-out value for a network of n nodes is given by $F=\ln(n)/\ln(\ln(n))$. (Note that this formula uses logarithms to base "e", not base 2). For a network of 128 nodes this gives F=3, as illustrated in FIG. 2. FIG. 5 shows, for a network of 100 nodes, that greater fan-out values result in a lot more traffic (left hand diagram) with only a small improvement in penetration rate (right hand diagram).

A typical data item would be generated at an event generator 10 (such as an RFID tag scanner, and disseminated by the associated relay device 1 through the network, to be captured by a device 6 associated with a higher level event consumer application 61 requiring that information, in order to trigger whatever correspondent action is required. The data is disseminated using an epidemic protocol.

We will consider how such data is handled by an individual relay 3 according to the invention. FIG. 2 shows in schematic form the various functional elements of such an individual relay device 3.

Note that, as shown, the relay 3 may itself have one or more associated readers 30 and event consumer applications 31

In this embodiment, the epidemic algorithm comprises two principal steps: the first is executed when a message is received and the second is executed to propagate the information. When an incoming message is received a verification process is carried out to avoid multiple deliveries of the same message. Any messages received for the first time are disseminated to a set of other processors, randomly selected.

FIG. 2 shows in schematic form the various functional elements of one of the nodes 3. These elements comprise a receiver 32; a query processor 33, an input processor 34 a history buffer 35, an aggregation processor 36 and a transmitter 37.

When the reader 30 collects data that may be required by a consumer application elsewhere in the network, an alert message is assembled into a Bloom vector message 90. A Bloom filter is a method to represent a set of elements and allow the resulting data set to be queried. Each filter consists of a vector of m bits, each of which is indexed by an incremental number from 1 to m. All the elements of the vector are initialised to 0 when the filter is empty. A set of independent hash functions $h1, h2, h3, h4, \ldots$. Is defined, which each produce a result that is within the range $\{1 \ldots m\}$. For each element E that is to be included in the filter, the bits in the vector having position values corresponding to $h1(E), h2(E), h3(E), h4(E) \ldots$ are set to 1. Note that any individual value may be generated by more than one hash function, but the combination of values is unique to the hash function.

Then, given a query for the presence of an element A, the bits in positions $h1(A), h2(A), h3(A)$ can be checked. If any of these bits are set to zero, it follows that the element is not represented by the filter. If all the bits are set to 1, there is a non-zero probability that the element is included in the filter. However, this probability is not equal to unity—there is a finite probability that the element is not included: this eventuality is called a false positive. The probability depends on three parameters:

m: representing the length of the vector,
H: representing the number of hash functions and
n: representing the number of elements included in the filter.

The classic optimisation for a Bloom filter is, given m and n, to find the number of hash functions H required to minimize the probability of a false positive. For H=6, if we consider m/n=10 we have a false positive ratio <0.01%. With m/n=15 the false positive value decreases to <0.001%.

It will be apparent that data can be readily added to a Bloom vector, although the probability of false positive increases with the amount of data included. In particular two Bloom vectors that were generated using the same set of "hash" functions can be combined by performing a logical "OR" operation on each term. Deleting data is not possible without incurring a high probability of false negatives.

The alert message will in general indicate that the data is available at a predetermined address (either identified in the message or previously identified to the destination device). However, if the data is very simple (an RFID identity, for example) it may itself form the alert message to be assembled in the Bloom filter. The resulting Bloom vector message 90 is passed to the aggregation processor 36 where it will be combined with any messages received from other nodes 1, 2, which will be forwarded with it to other nodes 4, 5. The new message 90 is also added to the history buffer 35, which stores a copy of all data that has been handled by the node 3.

Figure 4:
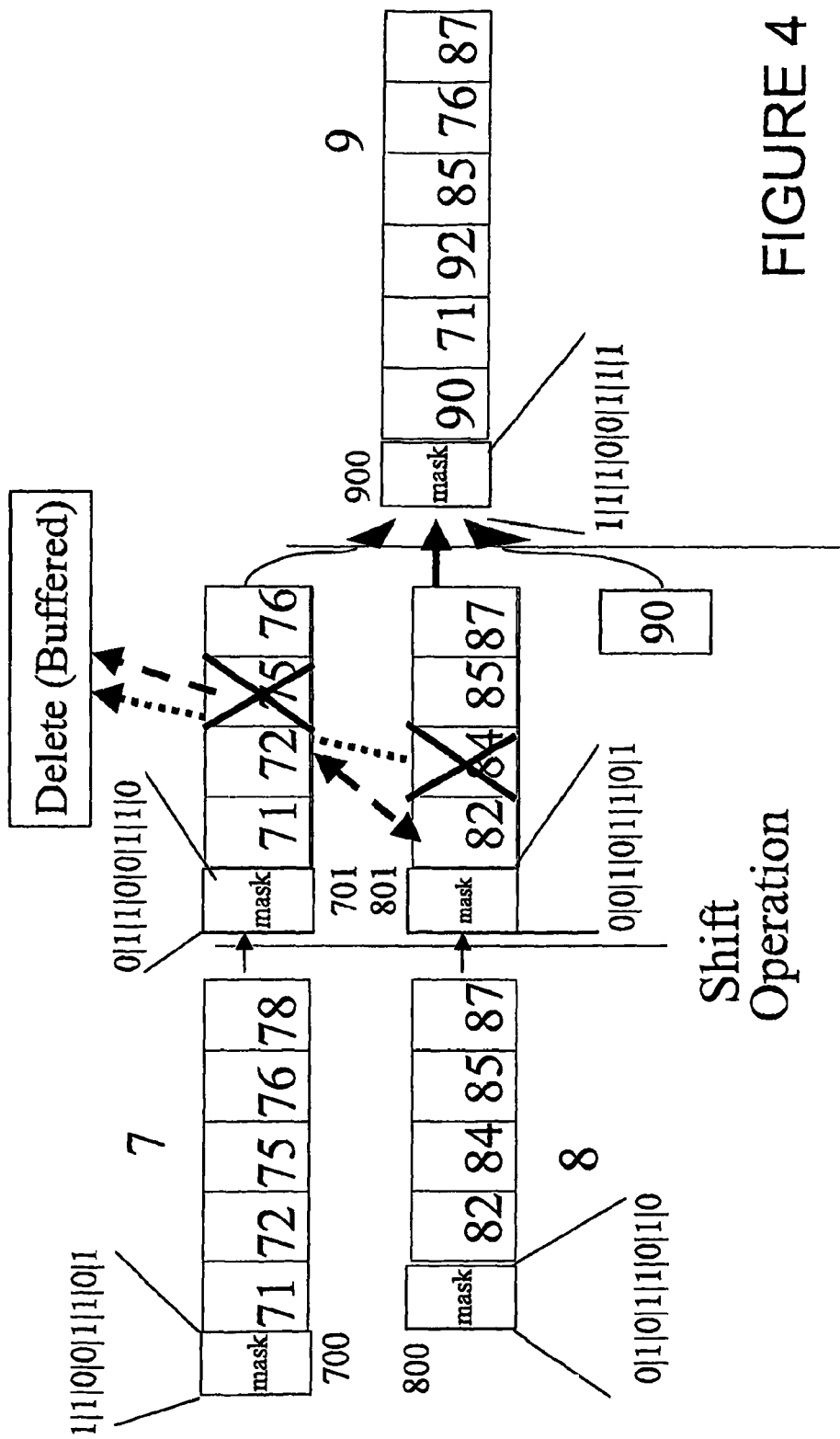
FIG. 4 is an illustration of the processing of the messages in a node.

We will now discuss the handling of data received from other nodes 1, 2. FIG. 4 shows two illustrative message bundles 7, 8 of the type transmitted between the nodes of the system, and the manner in which they may be aggregated to form a third message 9. This diagram has been simplified to illustrate the principle. It must be understood that the benefits of the inventive combination of the aggregation process and the epidemic are most apparent when a large number of messages are being distributed. In particular, the diagram shows the combination of two Bloom vectors to form a single new one, but it is of course possible to combine three or more.

The invention not only simplifies the administration of the network, but also reduces the bandwidth required. Since the messages are aggregated, the number of Bloom filters transmitted per node in each time slot is reduced. It can be shown that the number of messages transmitted is limited to a value not greater than "log(n)+k", instead of "n" if using a classic epidemic. The value will be less if some nodes have no message to send in that particular time slot. The value "k" determines the reliability (probability of all nodes being reached) and will be discussed later. Note again that all logarithmic values in this specification are to base 2 unless stated otherwise.

The first incoming message bundle 7 consists of a mask 700 and a series of individual messages 71, 72, 75, 76, 78: each comprising the data for one of the timeslots identified by the mask 700. The mask is a sequence of "1"s and zeros: The number of "1"s in the sequence identifies how many messages are contained in the message bundle, whilst the positions of those "1"s identify the timeslot with which an individual message is associated. The timeslot represents how many nodes that message has already visited within the network, and therefore how much of its "time to live" remains. It can be shown that a suitable lifetime for a newly-generated data item is given by the formula log(n)+k, where n is the number of nodes in the system, and k is a constant which determines the reliability of universal delivery whose value will be discussed later. For a system of 128 nodes this gives a value of 7+k. It can be seen from FIG. 5 (which uses a slightly smaller population of only 100 nodes) that for any value of F greater than 2 the number of nodes infected after seven rounds is very close to 100%.

The nodes are not synchronized but they each operate on a sequence of time steps, in each of which they generate or forward a message. For example if we consider a time step of 2 seconds, every 2 seconds a node will check if the buffer contains any messages to aggregate or to send.

The mask 700 shown at the input of FIG. 4 indicates that there are five messages in the associated bundle, their positions indicating they relate to events generated one, two, five, six and eight time steps ago. If no messages are generated by a node in a specific time step no message need be generated by that node for that time step. The absence of a vector for the other time steps therefore indicates that no events are recorded in this message bundle in respect of those steps.

The message itself contains a sequence of Bloom filter vectors. Each vector is associated to a specific remaining time-to-live, defined in the Mask. When the remaining time-to-live of a vector falls to zero, the vector is dropped.

The second incoming message bundle 8 similarly consists of a mask 800, which identifies the timeslots in respect of which the message bundle contains data, and a series of messages 82, 84, 85, 87: each comprising the data for one of the timeslots identified by the mask 800. Each individual message in the bundle is a Bloom filter vector. The processes that operate when the node 3 receives such message bundles will now be described, with reference to message bundle 7.

If the node 3 is associated with an event consumer device 31, the node's receiver 32 passes the incoming message bundle 7 to a query processor 33. The query processor queries the Bloom filters 71, 72, 75, 76, 78 in the message bundle to determine if it carries event-IDs of which it needs to be aware (process step 31). Querying a Bloom filter is a simple bit-matching function over a certain set of elements. If a match is found, the relevant data are passed to the associated device 31 requiring that data. Note that the data is also forwarded to the control processor 34 as part of the epidemic protocol, as it may also be needed by another device 61 associated with another node 6. It is in any case not possible to delete an individual data item from a Bloom filter message.

It would be possible to arrange for each node in the network to aggregate Bloom filter vectors until the vector has reached a level of saturation, defined such that the probability of false positive exceeds a defined threshold. However, because the data is bundled as a set of messages 71, 72, 75, 76, 78 of different ages a number of improvements in efficiency can be performed by the control processor 34.

The control processor 34 first compares the Bloom filter messages 71, 72, 75, 76, 78 in the bundle with those stored in the history database 35. If a complete message 75 is identical to one already in the database 35, this is indicative that the node 3 has already received an identical message from another source. Such a message can be deleted from the message bundle 7. The mask 700 is amended accordingly. This helps prevent multiple transmissions of the same message by the same node, by ensuring that messages are not repeatedly disseminated by the same node.

If the history buffer 35 is overloaded a random element from the buffer may be deleted.

The control processor 34 next applies a shift operation to the message bundle 7, thereby incrementing the timeslot position of each individual message 71, 72, 75, 76, and a revised mask 701 generated. Any message 78 in the final position is deleted as time-expired. This ensures that messages are not disseminated indefinitely. It can be shown that the average number of hops required for a message initiated from a node to reach another node is log(n). Since it is desirable that delivery reliability is better than average, the initial time-to-live is increased above log(n) by a value k selected such as to raise the probability of reaching all the other nodes to a value closer to unity. For example if we consider a network with 128 members and k=1, the number of timeslots is selected to be Log(n)+k, where n=128 is the number of nodes in the system. The time-to-live in this case would therefore be log(128)+1=8 steps.

Copies of the remaining messages 71, 72, 76 are added to the database 34 for comparison with future incoming messages.

The message bundle 8 is modified in a similar manner to that described for the message bundle 7, thereby generating a revised mask 801 and messages 82, 84, 86, 87.

A new message bundle 9 is then compiled by the aggregation processor 36 from the modified bundles 7, 8 and any new message 90. Each timeslot in the new message is occupied by a Bloom filter compiled from those in the corresponding places in the timeshifted incoming message bundles 7, 8, with the message 90 generated by the reader 30 (if any) placed in the vacant first timeslot.

Where only one of the bundles 7, 8 had a message 71, 84, 85, 76, 87 in a given timeslot, that message appears unaltered in the corresponding timeslot in the new bundle 9. (Note that in this example a message 75 was deleted as duplicating one in the database 35, so the message 85 is not combined with it. Message 84 was also deleted, but as in this case there was no corresponding message in the other bundle, the mask value is reset to zero).

Where messages 72, 82 having the same time to live are identified by a "1" on the respective terms in the masks 701, 801, the filters are aggregated using a logical "OR" operation. The result of the aggregation is another Bloom filter 92, which is added at the appropriate timeslot. It is also added to the historic buffer 35 so that it is not disseminated a second time.

The mask 900 for the new bundle is generated by a simple logical "OR" operation on the masks 701, 801, with a "1" as the first term if new data 90 has been generated. If no data has been captured by the reader (or if there is no reader associated with the node 3) the first term of the mask is a zero.

The transmitter 37 then selects a number "F" of neighbouring devices 4, 5, 6 selected randomly from those with which it is capable of communication, and sends copies of the message bundle 9 generated by the aggregation processor 36 to each of the selected nodes. The number of neighbours to be selected is known as the fanout value F, and in this example F=3. This type of epidemic protocol operates in a completely decentralised manner and simplifies administration of the network. Selecting nodes at random allows nodes to deal with infrastructure instability and have the load of the communication evenly distributed.

Having now described the embodiment in general, some particular details will now be discussed.

The fan-out value F determines how quickly the network becomes "infected" with a given message. FIG. 5 illustrates, for a network of 100 nodes and no aggregation, how a single message propagates. The left hand diagram indicates the number of messages propagated in each round whilst the right hand one indicates the number of nodes infected after each round, (which is closely related to the cumulative values of the left-hand diagram). It will be seen that a high fan-out value results in very high traffic levels for a brief period, with rapid saturation of the system. A value of F=3 results in almost complete saturation after about eight rounds.

Provided the number of events generated in a specific interval of time (time-step) is bounded, the optimum size of the Bloom Filter Vector can be determined to and control the probability of a false positive. Time-step and size of the vector are both variables that can be easily modified. The probability of a query to a Bloom filter generating a false positive is given by:

$$PFP = \left(1 - e^{-\frac{kn}{m}}\right)^k$$

where n is the number of events generated in a time step; m is the size of the Bloom Filter vector; k is the number of hash functions. If a network is able to generate 1000 events per second, and we consider a timestamp of 1 second, the size of the filter should be m=7000 bits, k=5. This is obtained fixing a PFP=0.05 (Note: this is not the real PFP of the algorithm because the events are distributed multiple times to the same node) Because they have been aggregated in different ways, the Bloom filters that contain them will not be the same.

It should be noted that a message, albeit itself new to the node, may contain an individual event that the node has already recorded. This is because the event may have been aggregated with different events as the respective messages propagated through the system. The identification of the same event in two different messages reduces the probability of it being a false positive from the value $p=(1-e^{kn/m})^k$ as discussed above, to $p^2$. Individual events cannot be dropped from the messages, even if they duplicate events already identified by the node or are of interest only to the present node—to do so would introduce false negatives as they may share bits in the filter with other events. The probability that any given node receives a particular message is approximated by $(1-(N\hat{}(-F)))$ where F represents the fan-out of the protocol and N represents the number of nodes in the system. The number of individual transmissions of the same message required to ensure, to a high probability, that all members of the network receive it at least once is of the order O (FN). This compares with protocols such as IP Multicast which has a bandwidth cost of the order O (N). However, with aggregation of the messages according to the invention, the bandwidth and reliability properties can be improved to be better than the classic IP multicast.

The improved efficiency of the process according to the invention can be illustrated by comparison with a case where aggregation is not used. Consider a network consisting of N nodes and their connections. Each node is randomly linked to K others, with the average connectivity being <K>. It has been shown that there is a threshold for connectivity at a mean degree of log(N). Consider now an epidemic algorithm running on this network. At each time interval T, each node forwards any new message that it received in the previous time interval to F randomly selected neighbouring nodes. On average, the number of such hops required for a message initiated from a node to reach another node is log(N), so the lifetime of a message in the network is also log(N).

During this time each node forwards the message once to each of F neighbours, the total number of message bundles generated during a full epidemic distribution is ~FN. The total traffic generated in the network due to a single epidemic round initiated from a single node is ~FN/log(N).

If we assume that M nodes in the network generate messages at an average rate λ, the epidemic traffic generated in the network per unit of time is:

$$tot - \text{traffic} \cong \frac{\lambda FNM}{\log(N)}$$

Now consider the behaviour of the same network when Bloom-filter vectors are aggregated. Each node aggregates all new messages that it receives within one time step, and forwards these to F neighbours in the next time step, in one or more bundles. Each bundle can contain only a certain amount of messages, say Nth.

To express this in more general terms, we define an aggregation function: f_agg(Nm)=Mb. The function maps Nm messages into Mb bundles. Upon receiving a message a node examines the messages in the bundle. It then assembles a new message bundle that contains only those messages not already present in the history buffer 23 and forwards them to F neighbours. Note however that each individual filter from the bundle is forwarded either complete (albeit possibly bundled with others) or not at all. Individual items of data within the filter remain encoded in the filter as long as the filter itself lasts.

Figure 3:
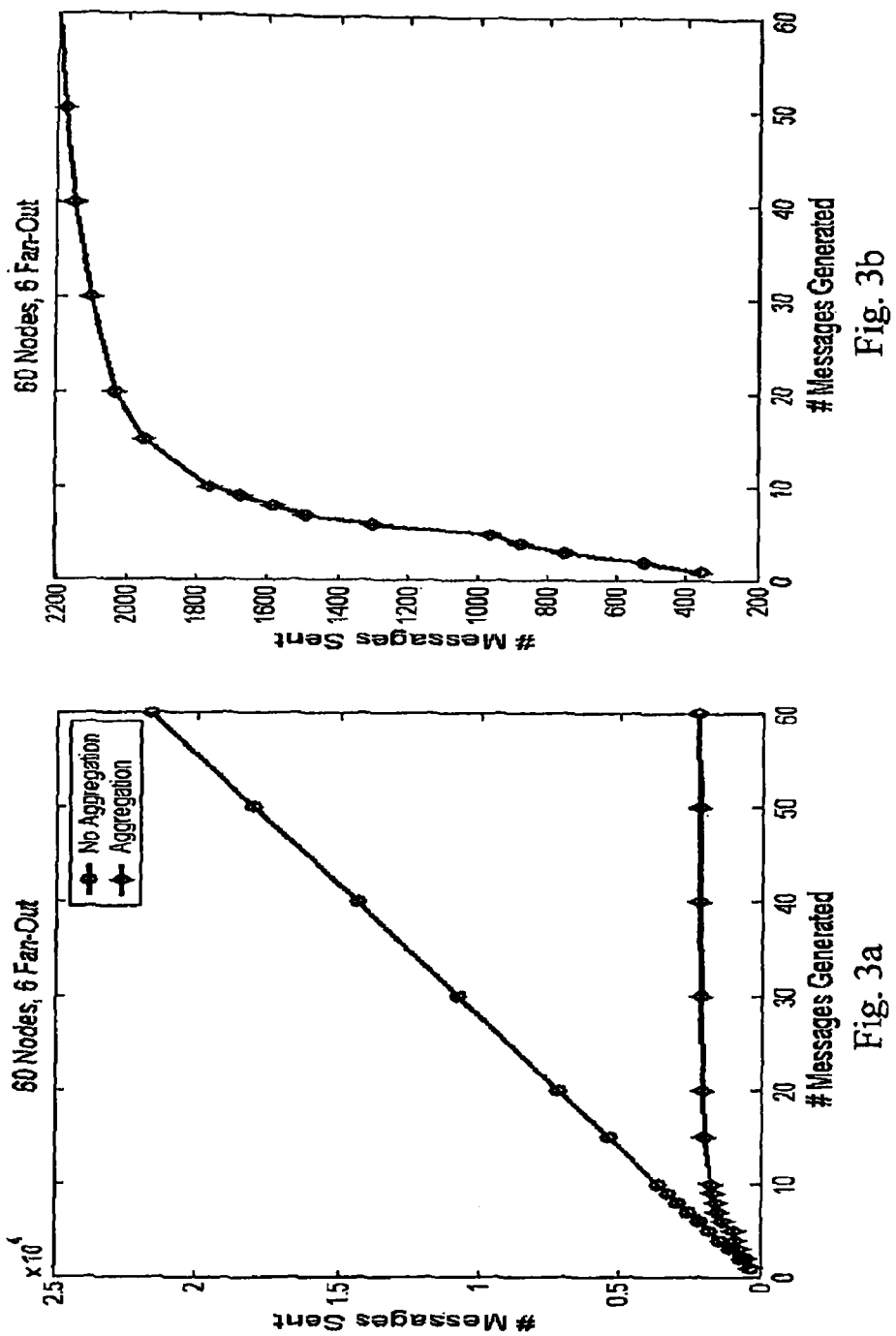
FIG. 3 is a comparison of the number of messages required for an aggregated message generation process according to the invention, in comparison with a non-aggregated process

The behaviour of the total traffic for L<Nth was simulated, and the results are shown in FIG. 3. Suppose that in a given time step a node generates one message, the total traffic generated during a full epidemic round where aggregation is not used is FN. If M nodes generate a message in each time step the total traffic during a full epidemic round is FNM. If we consider an aggregated epidemic the total traffic generated by a single node will again be FN, but if M nodes generate a message will be proportional to FN(log(M)). This is demonstrated in FIGS. 3a and 3b.

FIG. 3a shows the difference in behaviour between aggregation and not aggregation, plotted against the number of messages generated per time step. There were 90 nodes in the simulation, each with a fan-out value F=6. It will be seen that without aggregation, the number of messages sent increases linearly with the number generated. FIG. 3b is a view of the lower curve of FIG. 3a at an expanded scale, to demonstrate the logarithmic behaviour of the aggregated data.

In additional to the dissemination of data from a distributed set of sensors, another use of the invention could be in a computational grid. Computational grids are environments in which collection of geographically distributed hardware and software resources are made available to groups of remote users. Resources can be of different types: computers, storage spaces, instruments, and data, and their availability and capacity changes dynamically. Grid environments are very large scale operations, with millions of resources shared by hundreds of thousands of users, but lack any global centralized authority and have highly variable participation patterns. A basic service in large-scale grid environments is resource monitoring. This is required since Grid service brokers have to continuously match users' requests to available resources. The state of these resources (their availability, and the amount of available storage capacity and processing power at any given time) therefore needs to be continuously monitored. The invention could be used as a scalable and distributed event service for passive monitoring of Grid resources. As soon as the attribute of a Grid resource changes (e.g. its available processing power or storage capacity) the resources generate a new event which is distributed to all involved nodes using the epidemic and aggregation techniques of the invention.

The invention claimed is:

1. A method of transmitting data over a decentralised network, the method comprising:
  receiving a plurality of data files at a relay device, each of the data files having a respective predetermined expiry time, and at least one of the data files being a compressed data file,
  processing the data in the received plurality of data files by aggregating those of the received data files having a common predetermined expiry time to create a plurality of aggregated compressed data files, and
  broadcasting each aggregated compressed data file to a plurality of similar relay devices over the decentralised network,
  wherein the compression and aggregation technique applied to the data is a Bloom filter process, and
  wherein each individual aggregated compressed data file has a predetermined expiry time which is equal to the common predetermined expiry time of the received data files included in that individual aggregated compressed data file, and wherein are forwarded only those aggregated compressed data files for which the respective predetermined expiry times have not been exceeded, and wherein the aggregated compressed data files are broadcasted using an epidemic dissemination process.

2. The method according to claim 1, wherein data files received by a relay device having the same expiry time are aggregated into a single data file for further dissemination.

3. The method according to claim 1, wherein each relay device stores each data file received, compares subsequently received data files with those already stored, and suspends the aggregating and forwarding process for any duplicate data files identified.

4. The method according to claim 1, wherein at least some of the relay devices receive compressed data from an associated data generation and compression unit.

5. A relay device comprising:
  a receiver for receiving a plurality of data files, each of the data files having a respective predetermined expiry time, and at least one of the data files being a compressed data file,
  an aggregation processor for processing the data in the received plurality of data files by aggregating those of the received data files having a common predetermined expiry time to create a plurality of aggregated compressed data files, and
  a transmitter for selecting a plurality of similar relay devices and broadcasting each aggregated data file to the selected relay devices over a decentralized network,
  a unit configured to determine a predetermined expiry time for each aggregated compressed data file, the predetermined expiry time for said each aggregated compressed data file being equal to the common predetermined expiry time of the received plurality of data files included in that aggregated compressed data file, and selecting for transmission only those aggregated data files for which the respective predetermined expiry times have not been exceeded;
  wherein the relay device has a configuration to handle the data in the form of Bloom filters; and
  wherein the transmitter operates according to an epidemic dissemination process.

6. The relay device according to claim 5, wherein the aggregation processor is arranged to aggregate data files having the same expiry time aggregated into a single data file for further transmission.

7. The relay device according to claim 6 having a unit configured to disseminate a plurality of such aggregate data files having different expiry times.

8. The relay device according to claim 5, comprising data storage memory configured to store each data file received, and a processing unit configured to compare each stored data file with those subsequently received, and wherein the transmitter is arranged to only broadcast those received data files that are not duplicated in the data storage memory.

9. The relay device according to claim 5, further having a receiver configured to receive further data from a data generator, and a data compression unit configured to compress the data for transmission in an aggregated data file.

10. The relay device according to claim 5, having an analysis unit configured to analyze incoming aggregate data files to capture data contained therein.

11. A decentralised communications network comprising:
  a plurality of servers configured to collectively maintain a database that records event reports, the plurality of servers forming an overlay network and intercommunicating using a common messaging strategy based on a publisher forwarding scheme running over the overlay network, the servers being configured to aggregate compressed data messages having a common predetermined expiry time and being received from one or more other servers to create one or more compressed Bloom filter aggregate data files, and to broadcast the compressed aggregate data file to one or more of the other servers, at least one of the servers being configured to generate data files in response to specific events, and to aggregate the data files so generated with the data files received from the other servers, the servers being configured to modify the aggregate data files the servers receive before broadcasting them, wherein each individual aggregate Bloom filter data file has a predetermined expiry time which is equal to the common predetermined expiry time of the aggregate compressed data messages included in that Bloom filter data file, the servers being configured to forward, using an epidemic dissemination process, only the Bloom filter data files for which the respective predetermined expiry times have not been exceeded.

12. The decentralised communications network according to claim 11, wherein individual servers have a unit configured to delete from the data that is to be forwarded any data that has been previously received and forwarded by the same device.

13. The decentralised communications network according to claim 11, wherein individual servers have a unit configured to extract data required by a processing device associated with the server.

14. The method according to claim 1, wherein the data that is received at the relay device from different sources at a same time frame is aggregated by the Bloom filter process so that in each said time frame only a single Bloom filter data file is broadcasted by the relay device.

15. The relay device according to claim 5, wherein the data that is received by the receiver of the relay device from different sources at a same time frame is aggregated by the Bloom filters so that in each said time frame only a single Bloom filter data file is broadcasted by the transmitter of the relay device.

16. The decentralised communications network according to claim 11, wherein the data files that are received by at least one of the servers from different sources at a same time frame are aggregated by a Bloom filter process so that in each said time frame only a single Bloom filter data file is broadcasted by the at least one of the servers.

17. The method according to claim 1, wherein said broadcasting is performed without a specified destination.

18. The relay device according to claim 5, wherein said broadcasting is performed without a specified destination.

19. The decentralised communications network according to claim 11, wherein said broadcasting is performed without a specified destination.

* * * * *